US008305505B2

(12) United States Patent
Lean et al.

(10) Patent No.: US 8,305,505 B2
(45) Date of Patent: Nov. 6, 2012

(54) OPTOELECTRONIC PATTERNED TRANSIENT ELECTRODES FOR PARTICULATE MANIPULATION

(75) Inventors: Meng H. Lean, Santa Clara, CA (US); Shu Chang, Pittsford, NY (US); Patrick Y. Maeda, San Jose, CA (US); Jeng Ping Lu, San Jose, CA (US)

(73) Assignees: Palo Alto Research Center Incorporated, Palo Alto, CA (US); Xerox Corporation, Norwalk, CT (US)

( * ) Notice: Subject to any disclaimer, the term of this patent is extended or adjusted under 35 U.S.C. 154(b) by 152 days.

(21) Appl. No.: 12/947,019

(22) Filed: Nov. 16, 2010

(65) Prior Publication Data

US 2012/0120332 A1 May 17, 2012

(51) Int. Cl.
*G02F 1/135* (2006.01)

(52) U.S. Cl. ................ 349/25; 349/26; 349/27; 349/28; 349/29; 349/30

(58) Field of Classification Search ............... 349/25–30
See application file for complete search history.

(56) References Cited

OTHER PUBLICATIONS

Chiou et al., "Massively Parallel Manipulation of Single Cells and Microparticles Using Optical Images", Nature, vol. 436, Jul. 21, 2005, pp. 370-372.

*Primary Examiner* — Phu Vu
(74) *Attorney, Agent, or Firm* — Fay Sharpe LLP

(57) ABSTRACT

An optically based transport system and method for transporting particles across a virtual electrode array are disclosed. The system comprises a photoconductor layer where optically induced electrodes are projected thereon through sequential light images in a traveling wave grid pattern in order to transport particles across the virtual electrode array with a traveling wave.

19 Claims, 8 Drawing Sheets

OPTOELECTRONIC PATTERNED TRANSIENT ELECTRODES FOR PARTICULATE MANIPULATION

BACKGROUND

The present disclosure relates to particulate dispensing methods and apparatus for providing the same. In particular, the present disclosure provides for improving traveling wave grids and the electrodes therein to improve the movement and control of organic, inorganic and/or biological particles being carried.

Traveling wave grids are known in the art. See, for example, U.S. Pat. Nos. 6,351,623; 6,290,341; and 7,304,258. As explained in these documents, a traveling wave grid may, as shown in FIG. 1, be a single sided traveling wave grid device 100, such as an electrostatic traveling wave grid, comprising a plate 110, a plurality of parallel and closely spaced electrodes 112, 114, 116, and 118, and an effective amount of a carrier medium 120, of liquid or gel disposed in communication with the electrodes. In one design, the electrodes may be formed from platinum or alloys thereof. A thin layer of titanium may be deposited as a pattern on the plate, which may be glass, to form the e electrodes. A four phase electrical signal (Φ1-Φ4) is shown as being utilized in conjunction with assembly 100 where the phases are 90° apart. In general, there may ne n phases which are 360°/n apart. Accordingly, a first electrode such as electrode 112 may be utilized for a first phase Φ1 of the electrical signal. Similarly, a second electrode immediately adjacent to the first, such as electrode 114, may be utilized for a second phase Φ2 of the electrical signal. Additionally, a third electrode immediately adjacent to the second electrode, such as electrode 116, may be utilized for a third phase Φ3 of the electrical signal. Moreover, a fourth electrode immediately adjacent to the third electrode, such as electrode 118, may be utilized for a fourth phase Φ4 of the electrical signal. The distance between the centers of adjacent electrodes is referred to as pitch, and denoted as "p." The width of an electrode is denoted as "w," while the distance between facing sidewalls or edges of adjacent electrodes is "s." Further, as appreciated by one of ordinary skill in the art, the above concepts may be used to form a double sided grid assembly, which employs a second design similar to that as described and located so that the two surfaces are on either side of the carrier medium.

FIG. 2 is a schematic illustration of an electrophoretic traveling wave grid system (device) 200 utilizing multiple distributed, reconfigurable, and reprogrammable traveling wave grids. Specifically, the traveling wave grid system includes multiple grid segments, such as a first grid segment 210, a second grid segment 220, and a third grid segment 230. As will be appreciated, each segment includes a plurality of substantially parallel and proximately spaced electrodes. One or more buses 240, 250, and 260 can provide coupling to the four phase grid circuit. The system 200 further comprises one or more programmable voltage controllers, such as controllers A, B, and C. A sample 270 (of bio-material or other type of particles, e.g., toner particles) can be deposited onto the grid segment 210. The sample migrates to region 272 and continues to migrate onto adjacent grid segment 220, for example. Operation of system 200 continues until a region 274 of bio-molecules may form within grid 220. Depending upon the bio-molecules and grid parameters, the particles constituting region 274 may further migrate to adjacent grid segment 230, and form a region 276 of particles.

Presently, such traveling wave grids are formed through traditional semiconductor fabrication techniques (e.g., photo masking, metallization, etching, etc.).

Employing such fabrication techniques results in high manufacturing costs and a device which is not reconfigurable, i.e., the physical structure is permanent so the placement of the electrodes cannot be altered. Therefore, when another grid pattern is required, the fabrication process must again be undertaken. This is seen as a drawback in the art.

Another particle manipulation technique is discussed in an article by P. Y. Chiou, A. T. Ohta and M. C. Wu, entitled, "Massively Parallel Manipulation of Single Cells and Microparticles Using Optical Images", Nature, 436, July (2005), which was directed to precise manipulation of single microparticles in an active area of 1 mm×1 mm, by use of optical tweezers.

BRIEF DESCRIPTION

A system for transporting particles comprises a photoconductive layer as a photoreceptor system that receives an optical light image pattern of a virtual electrode array thereon. The virtual electrode array comprises optical transient electrodes that are reconfigurable on demand without pause of the system. The optical transient electrodes can be dynamically alterable so that a traveling wave grid can be configured to transport particles in various directions across a surface of the photoconductive layer.

DETAILED DESCRIPTION

Figure 1:
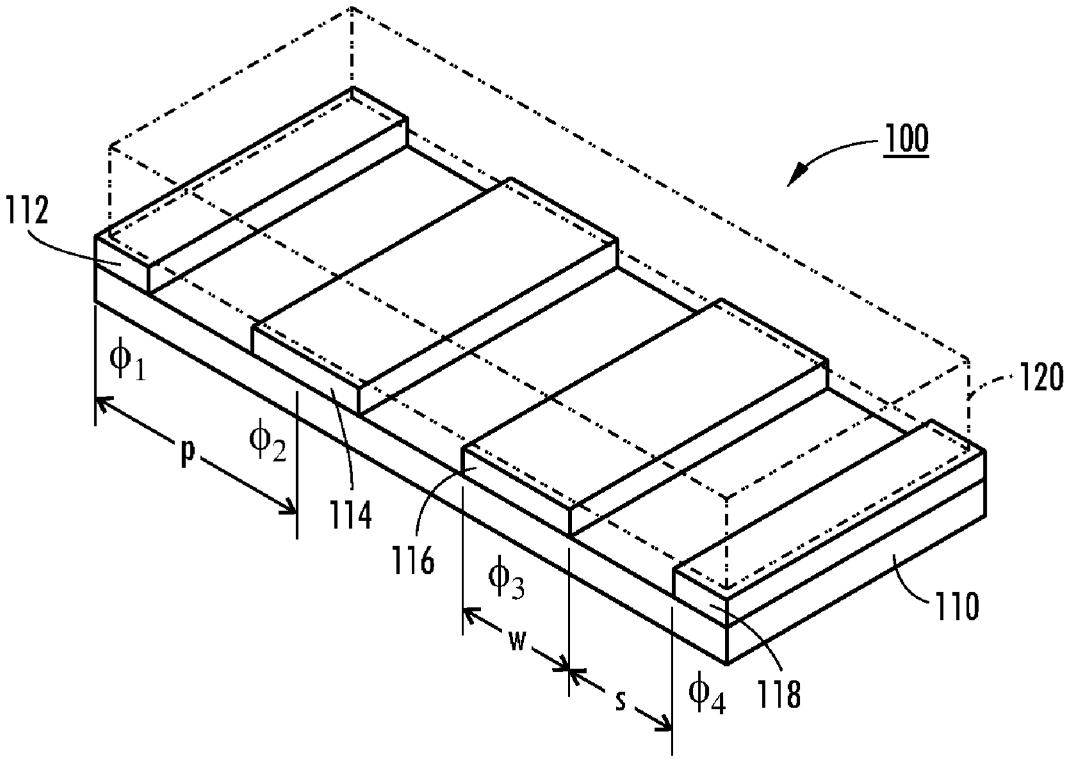
FIG. 1 is a schematic illustration of a traveling wave grid configuration.
Figure 2:
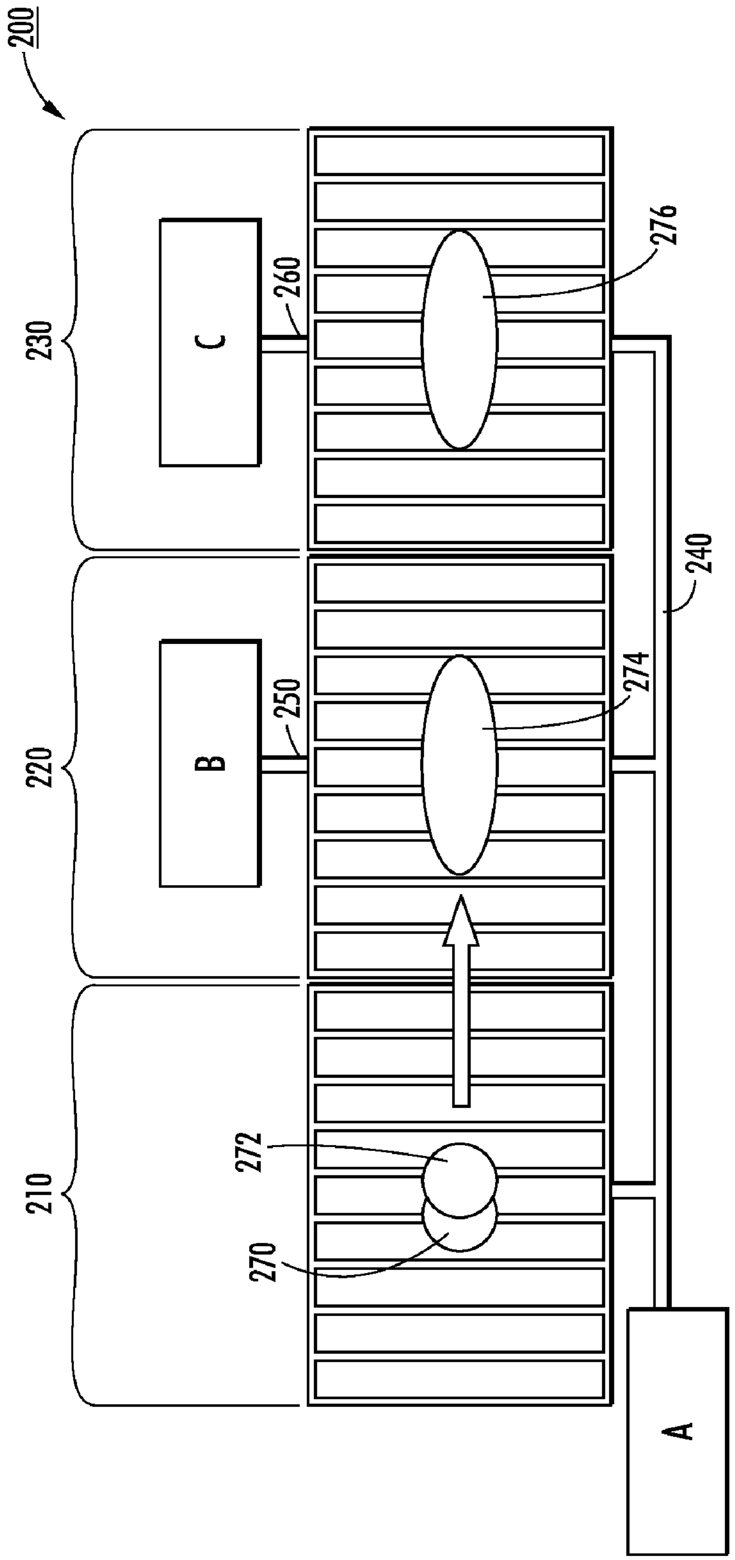
FIG. 2 is a toner particle transport from one electrode to another electrode.

As mentioned above, existing traveling wave grid devices, as described in connection with FIGS. 1-2, are pre-fabricated into a fixed physical form, which result in high manufacturing costs and inflexible configurations.

Therefore, the following discloses a transport system where an optical light image (e.g., a light image pattern) is coupled (e.g., optically coupled) to an electrical surface (e.g., to a photoconductor or photoreceptor) and projected thereon for creating virtual electrode grids. This system avoids the need for pre-fabrication of an electrode array and allows for flexible reconfigurations of the transport design.

Figure 3:
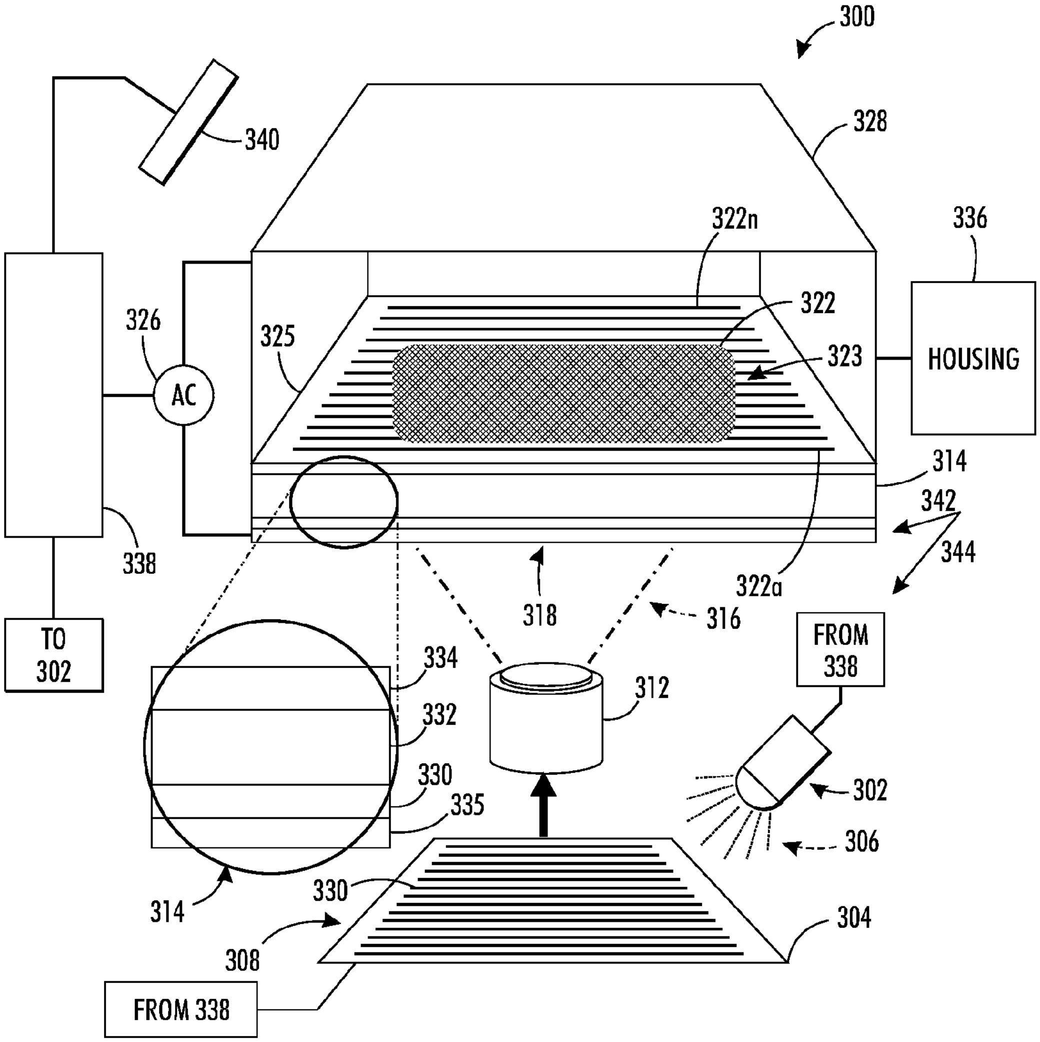
FIG. 3 is a schematic illustration of an optical transport system such as a virtual electrode array device having a traveling wave grid pattern according to one aspect of the disclosure.
Figure 4:
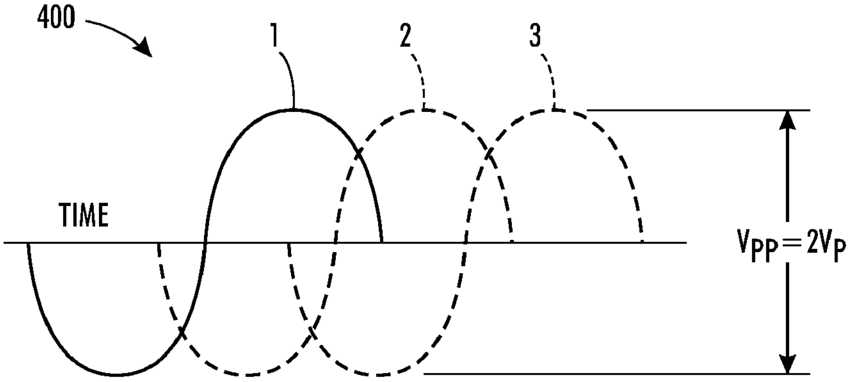
FIG. 4 is a sample waveform according to one aspect of the disclosure.

With reference to FIG. 3, illustrated is a schematic side view of an optical device structure for generating a dynamically, reconfigurable traveling wave grid on a photoconductive surface that may, in one embodiment, be implemented in a developer system of an electrophotographic printing machine. In other embodiments the system 300 may be used to transport biological, pharmaceutical or other particulates. Optical based transport system 300 comprises electrostatic forces that dynamically manipulate particulates, such as nanometer and micrometer-sized dielectric particles (e.g., toner, biological, pharmaceutical or other types of particulates).

In one embodiment, the optical based transport system 300 comprises a light beam source 302 focused toward a microdisplay chip 304. The light beam source 302 is any beam source operable to generate a light beam 306, such as a laser source, a light-emitting diode, halogen lamp, a charge coupling device, liquid crystal display, etc. for projecting a light image pattern. The microdisplay chip 304, upon which the light beam 306 is focused, is configured as an optical semiconductor device, such as a digital micro-mirror device (DMD), for example. The microdisplay chip 304 includes a surface 308 comprising multiple microscopic mirrors (not shown) arranged thereon. The arrangement of mirrors on the surface 308 are configured in the form of a rectangular or other array configuration, for projecting an image 310. The microdisplay chip 304 can therefore generate various images in an optical manner corresponding to pixels in the image 310 to be projected.

The optical based transport system 300 further comprises a focusing component 312 for magnifying the image 310 projected by the microdisplay chip 304 onto a photoconductive component 314. The focusing component 312 generates a projection beam 316, and thereby, creates, on a bottom surface 317, a projected light image pattern 318 which corresponds to a virtual electrode array 322 comprising high-resolution, light-patterned, optically induced electrodes 322*a*-322*n*. Such electrodes being used to form a non-uniform electric field to manipulate a layer of toner 323 comprised of toner particles 324, by an electrostatic traveling wave.

The virtual electrodes form the traveling wave grid pattern corresponding to the light image pattern 318 for transporting particles across an upper surface 325 of the photoconductive component 314.

The optical-based transport system 300 uses a multi-phase voltage source (also called a wave generator) 326. Voltage source 326 is in operative connection with a conductive layer 328 and the photoconductive component 314. In one embodiment, the conductive layer 328 is comprised of ITO (indium-tin-oxide) on an insulation material, such as a glass. The voltage source 326 generates phased output for wave generation. Another action of voltage source 326 is to apply an erase voltage between conductive layer 328 and photoconductive component 314, which erases the image on the photoconductive surface. The erase voltage being applied at a required frequency corresponding to a refresh rate or the images may be erased according to a photo induced discharge curve (PIDC). Also, in one embodiment the voltage source 326 applies an AC bias of between 500V to 1500V peak to allow an appropriate voltage latitude for traveling wave transport of toner in air.

The photoconductive component 314 comprises various featureless surfaces. In some embodiments an organic or inorganic photoreceptor such as those integrated into commercially available electrophotographic machines and operating in the 500V to 1500V peak range may be used. In other embodiments, the photoconductive component comprises a doped layer 330, an undoped layer 332, and a surface layer 334, arranged on an ITO-coated glass layer 335. Where the doped layer 330 comprises hydrogenated amorphous silicon of a doped species (e.g., an n type species), the undoped layer 332 comprises undoped hydrogenated amorphous silicon, and the surface layer 334 comprises silicon nitride.

Transport of particulate, such as toner is accomplished by positioning one end of the traveling wave grid in proximity to a housing unit 336 that provides the layer of particulate 323 at the upper photoconductive surface 325 and establishes an electrostatic traveling wave in a first direction of desired particulate motion. It is also shown that a computer controller (having a processor operating software) 338 is in operable connection to voltage source 326. This arrangement allows for control of the operation of the voltage source 326.

In one embodiment, also provided is a camera 340, which images the top or upper surface of the photoconductor component 314. Data regarding surface dimensions, etc., can then be used by computer/controller 338 (having appropriate software) to generate data for formation of image 110. Computer/controller 338 is also in operative connection with light beam source 302, to control its operation.

In one embodiment, the multi-phase voltage source 328 has a switching speed of between a few hundred Hertz and 5 kHz depending on the charge and the type of marking material being transported. The traveling wave may be DC phase or AC phase. When driven with optical images from conventional presentation software, the switching speed may be 30 to 240 Hz.

Electro-kinetic transport mechanisms include electrophoresis, dielectrophoresis, and electro-osmosis. For example, for toner in air, the Coulomb force F required to move the toner particles 424 from one optically induced electrode to an adjacent optically induced electrode is given by $F=Q\cdot E$ , where Q is the charge on the marking material particle, and E is the electric field established by the electrodes.

Whether from an AC or a DC waveform, a traveling wave grid corresponding to optically inducted electrodes 322*a*-322*n* is established in a first direction 342. Particles 324 travel from optically induced electrode to optically induced electrode due to their attraction to differently charged electrodes. Such traveling electric fields are produced by applying appropriate voltages of suitable frequency and phase within the virtual electrode array 322. For example, an AC distribution across the optically induced electrodes of the virtual electrode array 322 can be increased in one embodiment having a wide voltage gamut.

The optically induced electrodes 322*a*-322*n* of the virtual electrode array 322 correspond to the light image 318 projected thereon and comprise dynamically reconfigurable electrodes position to alter a direction path of the particles from a first direction 342 to a different second direction 344 without pause of the optical-based transport system 300, such changes being made by projection of a differently formed image from light source 302.

In one embodiment, the phase shift can be something less (or more) than 180 degrees. For example, respective phases may be 90 degrees from one another when traveling wave fields are optically generated.

Figure 5:
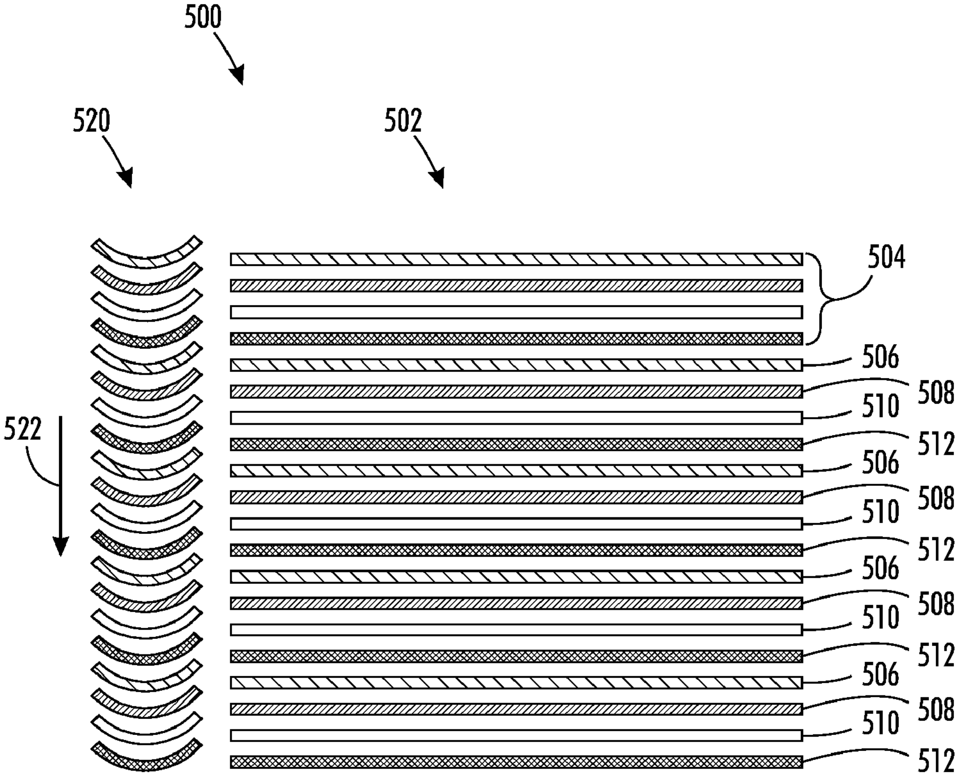
FIG. 5 is a schematic illustration of a transport electrode array according to one aspect of the disclosure.

FIG. 5 illustrates a light image pattern 500 of a virtual electrode grid array comprising optically induced electrodes according to the present application. The optically induced electrodes comprise a traveling wave grid pattern 502 comprising a transient electrode pattern 504 with a sequence of light image patterns 506, 508, 510, and 512, for example. The transient electrode pattern 504 is an optical pattern configured to change dynamically without pause of the system where projected (e.g., a develop system discussed above), and in a sequence with respect to one another in order to propagate particles. For example, using system 300 of FIG. 3 a traveling wave is generated by generating first transient electrodes corresponding to pattern 506 during a first phase, a second set of electrodes corresponding to light image pattern 508 during a second phase, a third set of electrodes corresponding to image pattern 510, during a third phase, and a fourth set of electrodes corresponding to image pattern 512 during a fourth phase. Light image patterns 506, 508, 510 and 512, are sequentially projected and dynamically reconfigured with respect to one another in order to propagate or transport particles across the virtual electrode grid.

In this example, the traveling wave grid pattern 502 is a four phase operation, where only every fifth pattern is imaged. Each pattern corresponds to a trace for holding a voltage and generating electrostatic forces thereat. The sequence of patterns projected can be in the order of 506, 508, 510, and 512, where the respective patterns may be projected for a quarter period with no dead time there between. In addition, the decay times can be correlated to a photo-induced discharge curve of the photoconductive layer.

Thus, in one embodiment, the various light image patterns 506, 508, 510, and 512 are optically projected to a photoconductive surface and differ in phases with respect to one another (e.g., by ninety degree quadrature). In addition, the respective patterns represent a different voltage applied thereat for generating a traveling wave that moves particles in a selected direction (e.g., from top to bottom of the page). In one embodiment, the traveling wave grid pattern 502 comprises the light image patterns configured to be rectilinear in shape. Alternatively and/or in conjunction, other image patterns can be implemented. For example, grid pattern 520 is a chevron grid pattern, which can focus particles and/or also move them in a vertical direction 522. So FIG. 5 may be understood, in one embodiment, to represent a single electrode array having two different electrode patterns (e.g., 502 and 520). It also shows that the device of FIG. 3 is able to reconfigure the array pattern (e.g., array 322 of FIG. 3 and array 500 (including patterns 502 and 520 of FIG. 5 on its surface.

Figure 6:
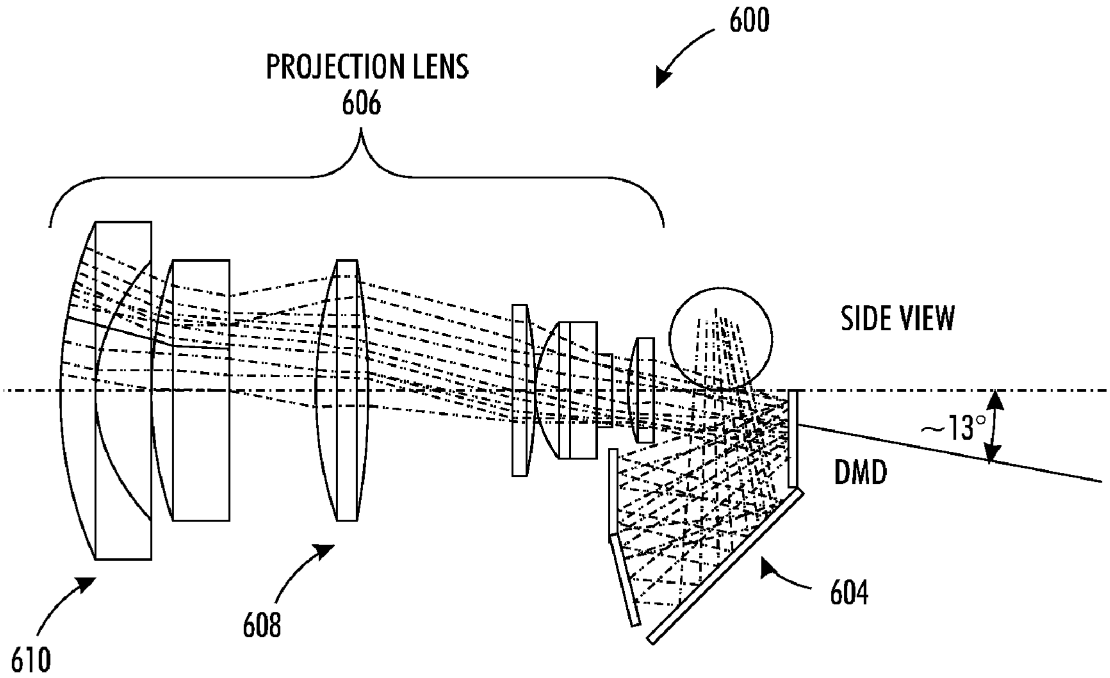
FIG. 6 is a schematic illustration of a projection system according to one aspect of the disclosure.

FIG. 6 illustrates a projection system 600 comprising lens designs for projecting a light image pattern onto a photoconductor. The projection system 600 can comprise a microdisplay chip 604, such as a DMD as adjusted so that it images a projected image onto a photoconductive substrate through projection lens arrangement 606. The projection lens arrangement 606 in some embodiments includes a flat field (PLAN) microscope objective 608 and additional lenses 610 for re-imaging onto the photoconductor. Due to a small field of view, a microscope objective is shown offset and tilted 612. For example, a projection offset angle can be about 13°.

This offset angle is to address the Scheimpflug principle where having the object plane tilted relative to the lens axis, the image plane will also be tilted in such a way that the object plane, image plane, and median plane through the lens will all meet.

In certain embodiments, the microscope objectives used may have a 10× or 5× magnification. The optical design specification for 10× and 5× microscope objective, respectively, are:

10×/0.25 NA PLAN Microscope Objective

| Type | Plan Objective JIS |
|---|---|
| Effective Focal Length | 16.0 mm |
| Working Distance | 0.7 mm |
| Numerical Aperture | 0.25 |
| Overall Length | 30.5 |
| Thread Length | 4.5 |
| Length of Ocular | 26 |
| Ocular Diameter | 21.2 |
| Overall Diameter | 22.7 |

Image field size~1.4 mm×1.05 mm
DMD pixel image size~1.4 μm
Resolution~1.0 μm
Image plane tilt~90−88.68°=1.32°
Working distance=0.7 mm
Flange to DMD distance=150.0 mm
5×/0.18 NA PLAN Microscope Objective

| Type | Plan Objective JIS |
|---|---|
| Effective Focal Length | 26.5 mm |
| Working Distance | 19.0 mm |
| Numerical Aperture | 0.18 |
| Overall Length | 45.2 |
| Thread Length | 4.5 |
| Length of Ocular | 40.7 |
| Ocular Diameter | 21.2 |
| Overall Diameter | 22.7 |

Image field size~2.8 mm×2.1 mm
DMD pixel image size~2.8 μm
Resolution~1.4 μm
Image plane tilt~90−87.36°=2.64°
Working distance=19.0 mm
Flange to DMD distance=150.0 mm In one embodiment, the projection system 600 is designed so a page sized image projection is projected onto a photoconductor (e.g., 8½ by 11, a page size of A4, A3, among others).

Figure 7:
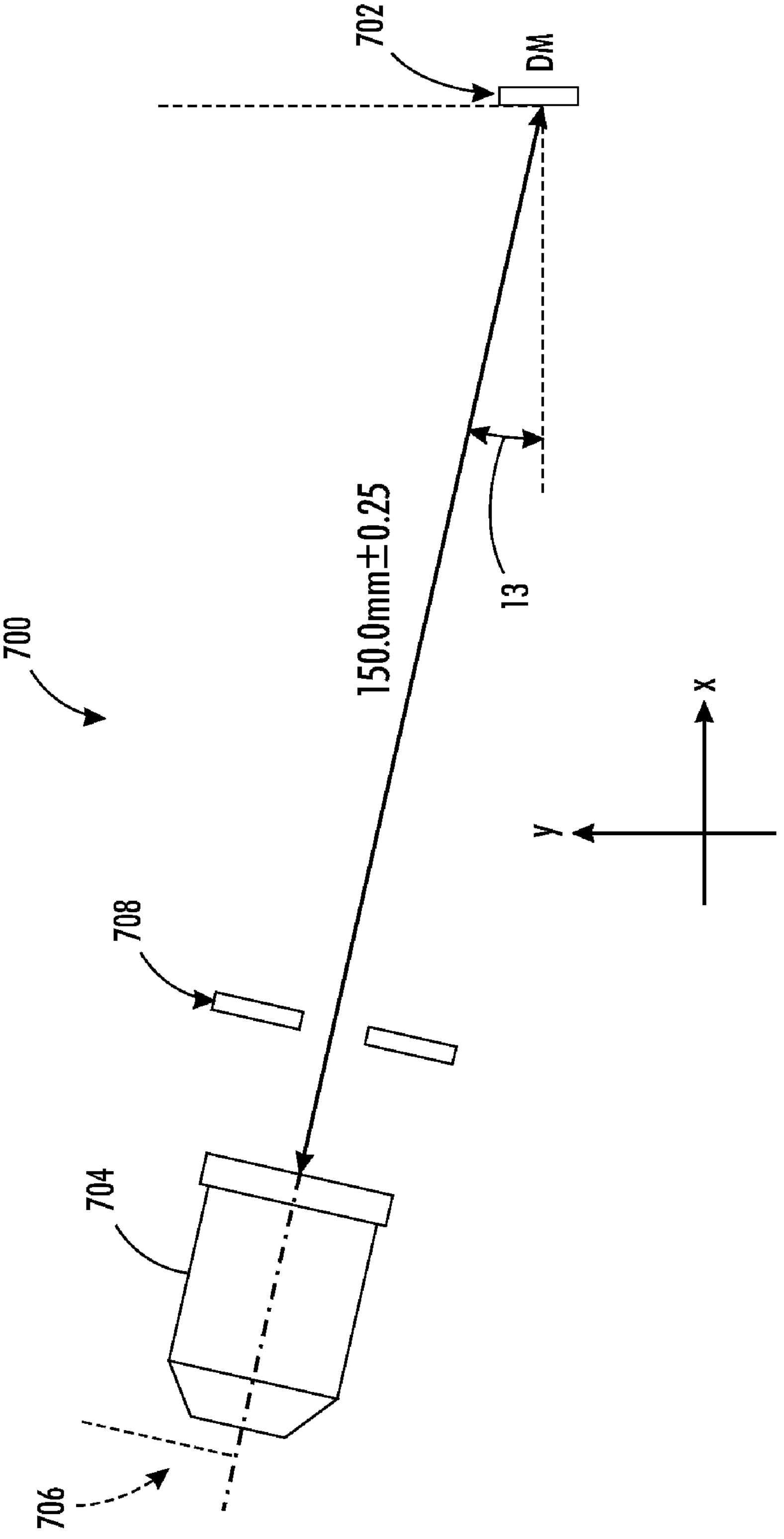
FIG. 7 is a schematic illustration of a projection system according to one aspect of the disclosure.

FIG. 7 illustrates another example of an optical layout 700. Images can be projected from a projector DMD 702, through microscope objective 704 and to image plane (i.e., photoconductor) 706. The microscope objective 704 includes a ±5 mm x and y adjustment, for example, and is aligned at an angle offset (e.g., about 13°). In addition, a stray light baffling component 708 is implemented along the path of projection between the microscope objective and the projector DMD to filter out stray light.

Figure 8:
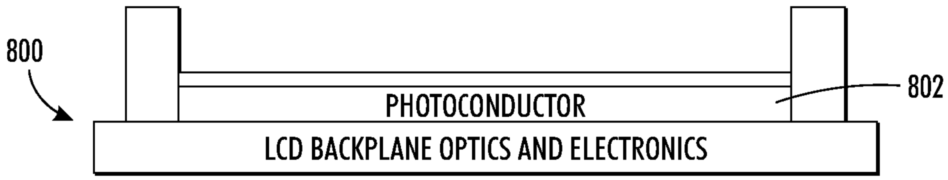
FIG. 8 is a schematic illustration of a projection system according to one aspect of the disclosure.

FIG. 8 depicts another image projection embodiment, where a display panel 800 (i.e., a liquid crystal display (LCD) or a charge coupled device (CCD)) is positioned on a side of a photoconductive component 802. The assembly 850 is placed in operational relationship with the device 300 of FIG. 3. For example, the liquid crystal display 800 is configured to project images, such as light image patterns onto photoconductive layer 802. The display panel 800 is sized to project a page sized image pattern onto the photoconductive component 802 to optically induce virtual electrodes.

The display panel can be an LCD or CCD display panel that may be a 22 inch diagonal screen or of lesser or greater size. Various page sizes may be projected by the display panel (e.g., 8½×11 inch sizes, A4, etc.). An aspect ratio of 16:10 can be provided by one embodiment of panel 850 for projecting an 8½×11 size image, A4 size image or A3 size image, among others.

Figure 9:
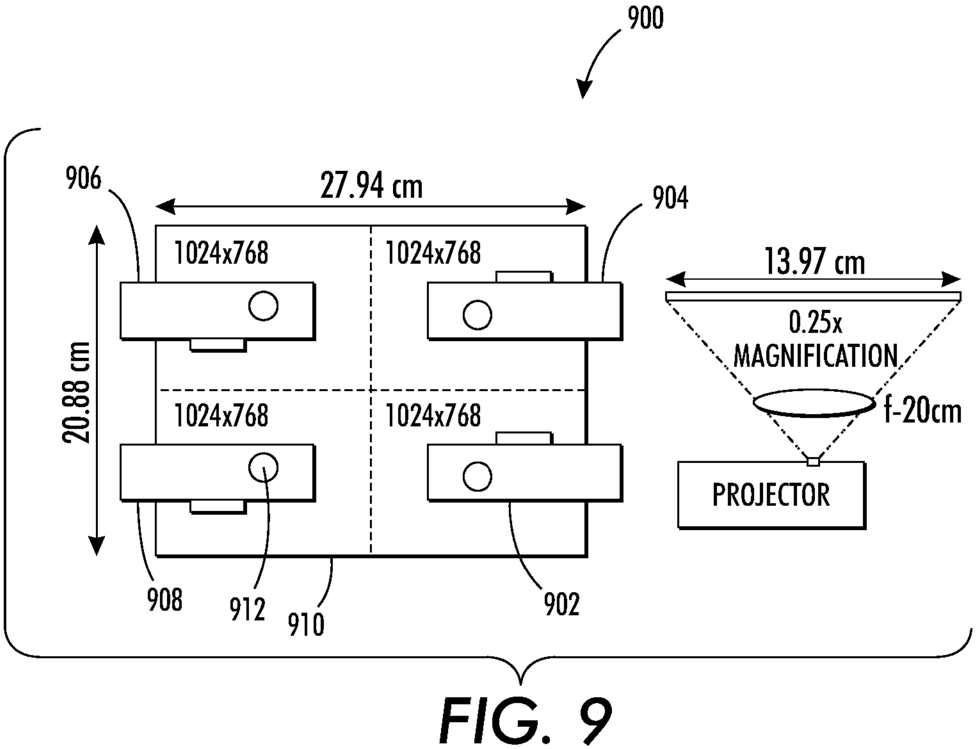
FIG. 9 is a schematic illustration of a projection system according to one aspect of the disclosure.

FIG. 9 illustrates another optical projection system 900 of the present disclosure operable to project images that are page sized onto a photoconductive layer for an optimal grid layout. The optical projection system 900 comprises several screen areas, for example, that can be 1024×768 pixel sized area. Four different projectors 902, 904, 906, and 908 can be coupled together to project respective images on a screen area 910, for example. Images from the four projectors can be software-stitched together in a 2×2 array. A total area can be approximately 20.88 cm by 27.94 cm with the individual respective areas approximately 13.97 cm wide and 10.44 cm high. An extra lens (e.g., a convex lens) can be placed in front of respective projectors 902-908 in order to de-magnify a minimum size image to a 13.97 by 10.44 cm area, which can match a size of a quarter of a page sized image.

Figure 10:
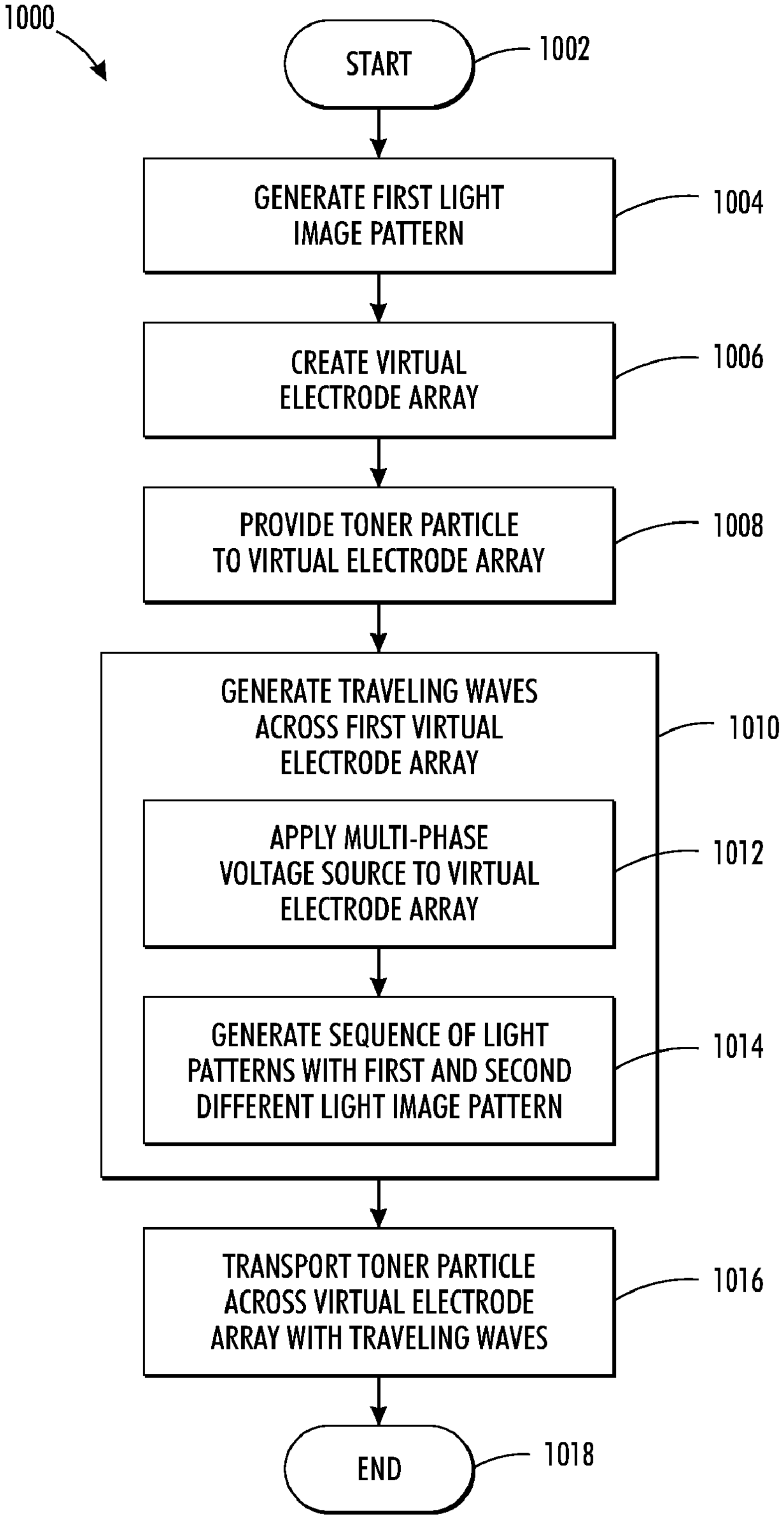
FIG. 10 is a flow chart outlining one exemplary method for transporting toner according to one aspect of the disclosure.

FIG. 10 illustrates an example methodology 1000 for transporting particles across a virtual electrode array comprising optically induced electrodes. While the method 1000 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

The method 1000 initializes at start 1002. At 1004 a first light image pattern is generated. In one embodiment, the light image pattern can be generated by a light source, a microdisplay device, and an objective lens assembly (e.g., a microscope objective). The first light image pattern is projected to a photoconductive layer where a virtual electrode array comprising optically induced electrodes is created 1006. An AC voltage phase is applied to the photoconductive layer, which is activated to support a voltage at the areas in which the light image is projected to for a virtual electrode array thereat.

In one embodiment, the objective lens assembly comprises an additional lens that is a flat field microscope objective to account for an offset angle of the microdisplay. In another embodiment, a liquid crystal or a charge-coupled device can be implemented to project the light image pattern to the photoconductive layer.

In one embodiment, the first virtual electrode array created at 906 can be reconfigured to a second different virtual electrode array at the photoconductive surface. The particle can then be transported via a traveling wave from a first direction of travel to a second direction, which is different from the first.

Particles are provided to the virtual electrode array at 1008. The particles can react to the electrodes formed by the virtual electrode array, which comprises a dynamically reconfigurable electrode array. At 1010 traveling waves are generated across the virtual electrode array formed. In one embodiment, the traveling waves are generated at 1012 by applying a multi-phase voltage source to the virtual electrode array from the photoconductor layer in which the array is projected, and at 1014 a sequence of light patterns with a first light image pattern and a second light image pattern that is different from the first is generated. Consequently, traveling waves can be formed, in which the phases of the waves respectively differ from one another and transport particles (e.g., organic or inorganic particles) in a first direction at 1016 across the virtual electrode array. At 1018 the method finalizes.

It will be appreciated that various embodiments of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An optical based transport system comprising:

a light source for generating a light image pattern;

a featureless photoconductive component positioned to receive the generated light image pattern;

a conductive layer;

a multi-phase voltage source in operative connection with the photoconductive component and the conductive layer;

a virtual electrode array located on a photoconductive surface of the photoconductor component, and comprising optically induced electrodes corresponding to the light image pattern provided on the photoconductive surface;

wherein the optically induced electrodes comprise a traveling wave grid pattern comprising a sequence of light image patterns to generate traveling waves and configured to transport particles located on the surface of the photoconductive surface.

2. The system of claim 1, further comprising a projection system comprising a microdisplay chip with a plurality of reflecting surfaces thereon, and configured to receive light beams from the light source, wherein the light beam defines the light image pattern and the microdisplay is positioned to project the light image pattern towards the photoconductive surface; and a microscope objective configured to offset a projection offset angle of the microdisplay chip and to project images through the microscope objective onto the photoconductor layer.

3. The system of claim 1, wherein the voltage source is configured to provide an AC bias of 500V to 1500V peak.

4. The system of claim 1, wherein the photoconductive component is a photoreceptor.

5. The system of claim 4, wherein the photoreceptor is one of an organic or inorganic photoreceptor having a voltage operation range of 500V to 1500V peak.

6. The system of claim 1, wherein the virtual electrode array is a page-sized array.

7. The system of claim 1, wherein the optically induced electrodes comprise dynamically reconfigurable electrodes configured to alter a direction path of particles from a first direction to a different second direction.

8. The system of claim 1, wherein the light source comprises at least one of: a laser beam source, a light-emitting diode, and a halogen lamp.

9. The system of claim 1, wherein the light source comprises a liquid crystal display or a charge coupled device array for illuminating the light image pattern.

10. The system of claim 1, further including a housing unit for storing toner particles, wherein the housing is positioned in relationship to a surface of the photoconductor component to provide a layer of toner to the photoconductor surface.

11. A method for transporting particles across a virtual electrode array comprising optically induced electrodes, comprising:

generating a first light image pattern onto a photoconductive surface in the form of a traveling wave grid;

creating a first virtual electrode array on the photoconductive surface;

providing particles to the first virtual electrode array;

generating traveling waves across the first virtual electrode array;

transporting at least one particle across the first virtual electrode array with the traveling waves thereat.

12. The method of claim 11, wherein creating the first virtual electrode array comprises providing an offset lens at an offset distance from the center of a microdisplay device and magnifying the image therefrom onto the photoconductive surface through a microscope objective.

13. The method of claim 11, wherein generating traveling waves comprises:

applying a multi-phase voltage source to the first virtual electrode array; and generating a sequence of light image patterns with at least the first light image pattern and a second different light image pattern, where the traveling waves respectively differ in phase.

14. The method of claim 11, comprising reconfiguring the first virtual electrode array to create a second different virtual electrode array located on the photoconductive surface of a second traveling wave pattern in a second direction different from the first direction and transporting the toner particle there along.

15. The method of claim 11, wherein the generating of the first light image pattern includes passing the first light image pattern through a microscope objective prior to creating the first virtual electrode array on the photoconductive surface.

16. A transport apparatus, comprising:

a light source for generating a light image pattern onto a photoconductive surface;

a wave generator for generating a plurality of traveling waves;

a housing unit for storing developer material comprising toner particles; and a virtual electrode array coupled to the wave generator and comprising a plurality of optically induced electrodes corresponding to the light image pattern provided onto the photoconductive surface and respectively comprising different driving voltages configured to propagate the toner particles by the traveling waves generated thereat;

wherein the optically induced electrodes and the wave generator are configured to transport the toner from the housing unit and across the photoconductive surface by the traveling waves generated.

17. The transport apparatus of claim 16, wherein the toner particles comprise a substantially similar size with respect to one another, and the plurality of traveling waves respectively differ in phase to move the toner particles in a first direction and in a second different direction.

18. The transport apparatus of claim 16, wherein the wave generator comprises a multi-phase voltage source coupled to the optically induced electrodes of the virtual electrode array to generate a first electrodynamic wave pattern in a first direction for moving the toner particles in the first direction and a second electrodynamic wave pattern in a different second direction for moving the toner particles in the second direction.

19. The transport apparatus of claim 17, wherein the virtual electrode array comprises a transient electrode pattern comprising a sequence of light image patterns configured to change dynamically in time without pause of the development system and in a sequence with respect to one another.

* * * * *